United States Patent
Fritz et al.

(10) Patent No.: US 9,616,756 B2
(45) Date of Patent: Apr. 11, 2017

(54) RETARDER BRAKE SYSTEM OF A VEHICLE COMBINATION

(71) Applicant: Deere & Company, Moline, IL (US)

(72) Inventors: Norbert Fritz, Ilvesheim (DE); Rainer Gugel, Plankstadt (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/134,955

(22) Filed: Apr. 21, 2016

(65) Prior Publication Data

US 2016/0318402 A1    Nov. 3, 2016

(30) Foreign Application Priority Data

Apr. 30, 2015 (DE) .................. 10 2015 208 113

(51) Int. Cl.
  *B60L 7/10*  (2006.01)
  *B60L 7/24*  (2006.01)
  *F02D 13/04*  (2006.01)

(52) U.S. Cl.
  CPC ......... *B60L 7/24* (2013.01); *B60L 7/10* (2013.01); *F02D 13/04* (2013.01); *Y10S 903/902* (2013.01)

(58) Field of Classification Search
  CPC .............. B60L 7/10; B60L 7/24; F02D 13/04
  See application file for complete search history.

(56) References Cited

U.S. PATENT DOCUMENTS 7,147,070 B2 * 12/2006 Leclerc ............... B60K 1/00
   180/14.2
8,215,436 B2 * 7/2012 DeGrave ............. B60L 7/08
   180/165

FOREIGN PATENT DOCUMENTS

| CA | 2457216 C | 9/2011 |
| EP | 0689978 A2 | 1/1996 |
| EP | 1918180 A1 | 5/2008 |
| WO | 2008086087 A2 | 7/2008 |

OTHER PUBLICATIONS

German Search Report in counterpart application No. 102015208113.3 dated Apr. 25, 2016 (8 pages).
European Search Report in foreign counterpart application No. 16167346.2 dated Sep. 21, 2016 (8 pages).

* cited by examiner

*Primary Examiner* — John Walters
*Assistant Examiner* — James Triggs

(57) ABSTRACT

A retarder brake system of a vehicle combination including an agricultural tractor and an electrically driven trailer includes a drive train with a combustion engine, a vehicle transmission downstream from the combustion engine, a mechanical drive axle of the agricultural tractor connected to a first gear output of the transmission, a first electrical motor generator unit coupled to a second gear output, and an electrical drive axle of the trailer. The electrical drive axle is driven by means of a second electrical motor generator unit. The generator units are electrically connected with one another via a direct current link. In a retarder operation, the second electrical motor unit is operated with a generator and the first electrical generator unit is operated with a motor. At least part of the gross retarder output requested on the electrical drive axle is dissipatively destroyed as a power loss within the drive train.

5 Claims, 3 Drawing Sheets

RETARDER BRAKE SYSTEM OF A VEHICLE COMBINATION

RELATED APPLICATION

This application claims the benefit of German Application Ser. No. 102015208113.3, filed on Apr. 30, 2015, which is hereby expressly incorporated by reference in its entirety.

FIELD OF THE DISCLOSURE

The present disclosure relates to a retarder brake system of a vehicle combination including an agricultural tractor and an electrically driven trailer.

BACKGROUND

Traditional retarder brake systems are based on the carrying out of a motor braking, which makes it possible to delay a vehicle that is driven by means of a combustion engine without actuating corresponding wheel brake devices. With vehicle combinations, this can lead to problems since a trailer attached to the vehicle remains unbraked in such a case and acts, from behind, by pushing onto the vehicle. In traveling over a slope, this can lead to an undesired giving way of the vehicle combination ("jackknifing") in combination with a correspondingly high mass of the trailer. Corresponding observations are valid for the retarder devices that are normally separate in use with trucks.

On the other hand, electrically driven attachments and additional devices are increasingly important, especially in the agricultural field. Electrically driven trailers also belong here, i.e., those with electrical drive axles, which, above all, in the execution of transporting work, are characterized by improved traction and energy efficiency. Such an electrical drive axle for an agricultural trailer is, for example, offered by the Fliegl Company under the name "Power DriveElect."

SUMMARY

The present disclosure provides a retarder brake system that is adapted for use with an electrically driven trailer. The retarder brake system of a vehicle combination consisting of an agricultural tractor and an electrically driven trailer includes a drive train with a combustion engine, a vehicle transmission downstream from the combustion engine, a mechanical drive axle of the agricultural tractor that is connected with a first gear output of the vehicle transmission, a first electrical motor generator unit that is connected with a second gear output, and an electrical drive axle that is assigned to the trailer. The electrical drive axle can be driven by means of a second electrical motor generator unit, wherein the two electrical motor generator units are electrically connected with one another via a direct current link. In a retarder operation, the second electrical motor generator unit is operated by a generator and the first electrical motor generator unit is operated by a motor, so that at least one part of a gross retarder output requested for the electrical drive axle is dissipatively destroyed as a power loss within the drive train.

The present disclosure makes use of the fact that each of the components of the drive train is associated with a specific power loss, wherein the power losses increase with increasing gross retarder output. Among the loss-associated components are not only the combustion engine, the vehicle transmissions, and the two electrical motor generator units, but also two-way inverters, located between the two electrical motor generator units and the direct current link, and other mechanical drive components, such as differential gears, wheel drives, axle bearings, and tractor or trailer tires. Thus, as a result of the flexing work to be undertaken while traveling over a ground surface, the latter also contribute, to a certain extent, to the losses with the drive train.

The extent of the braking effect attained by means of the retarder brake system can be specified by a vehicle operator via an operating unit. A control unit converts the operator specification into a corresponding retarder request. The gross retarder output requested, as a result of the retarder request, from the electrical drive axle of the trailer can be varied hereby by a corresponding control of the two-way inverter on the basis of the carrying out of a complete or partial generator operation of the second electrical motor generator unit within an output range defined by its rated output; for this purpose, both two-way inverters operate as shunt regulators. The excessive, that is, not dissipatedly destroyed, gross retarder output benefits the mechanical drive axle of the agricultural tractor and is available as a corresponding propulsive power. The latter takes care that the trailer and agricultural tractor are always under a certain tension in the area of a corresponding trailer coupling; consequently, an undesired giving way of the vehicle combination is reliably avoided.

Since the retarder brake system in accordance with this disclosure uses the components of the drive train of the vehicle combination, which are present in any case, including the cooling comprised by it, to remove the resulting heat caused by power loss during the retarder operation, the use of separate retarder devices, as is common with trucks, is superfluous.

The combustion engine is also operated in a motor brake operation to increase the braking effect. For this purpose, the fuel provision of the combustion engine is interrupted or at least extensively throttled, so that an increased motor drag torque or compression torque can be built up by the combustion engine. Since the effect of the motor brakes increases with increasing speed (RPM) of the combustion engine, it is conceivable that, at the same time, the gear of the vehicle transmission is downshifted in an automated manner in accordance with the requested gross retarder output. The latter can also take place with regard to the maintenance of a specific travel speed of the vehicle combination. In this way, the braking effect can also be increased via the power loss of the drive train, and consequently its net retarder output, beyond the theoretically possible gross retarder output of the second electrical motor generator unit. The vehicle transmission is a continuously variable transmission or, for example, a so-called IVT (Infinitely Variable Transmission).

In particular, the motor brake operation is released only if one detects that while carrying out the retarder operation, the power loss of the drive train, and thus the net retarder output, has been exhausted.

Stated more precisely, the motor braking does not take place as long as the retarder requirement that is derived from the operator specification is held within the framework of the (possible) net retarder output. If it goes beyond this, the control unit causes an increase of the braking effect by adding the motor brake. This ensures that there is always a certain tension on the trailer coupling between the trailer and the agricultural tractor.

In order to increase the fraction of the dissipatively destroyed gross retarder output, it is conceivable that additional units operated by means of the combustion engine use up at least one part of the gross retarder output. The additional units can be hydraulic pumps, air compressors, cooling fans, and the like, wherein they are purposefully turned on to increase the power loss and thus the net retarder output. Moreover, a turning on of the electrical consumers, such as an electrical drive axle of the agricultural tractor, is possible.

Furthermore, the second gear output can be a front PTO shaft connection, on which the first electrical motor generator unit is placed in a detachable manner. The first electrical motor generator unit can thereby be a component of a so-called PTO shaft generator. The PTO shaft generator represents a separate structural unit which consists of a carrying structure. This has an intermediate gear that can be connected with the PTO shaft connection of the agricultural tractor and an electrical motor generator, which is downstream from the intermediate gear. Such a PTO shaft generator is used in particular for the energy provision of electrically driven attachments and additional devices that can be placed on the agricultural tractor. It should be noted here that, in contrast to this, the first electrical motor generator unit can also be a structural component of the agricultural tractor. For reasons having to do with space constraints, however, and especially in the case of an increased output demand in the range above 25 kW, an attachment solution independent of the structural circumstances of the agricultural tractor is possible and may be desirable.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
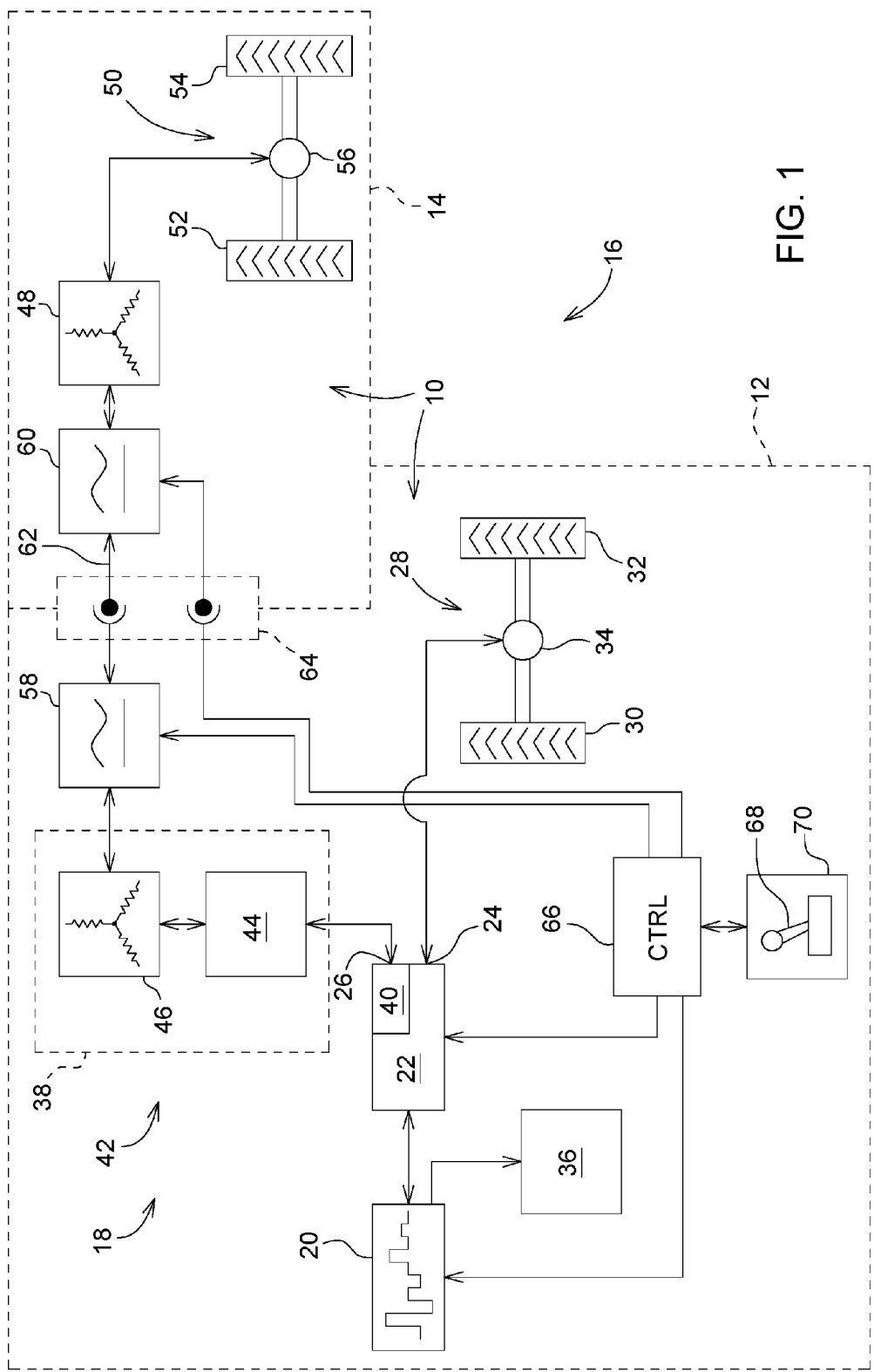
FIG. 1 illustrates an embodiment of a retarder brake system for a vehicle combination consisting of an agricultural tractor and an electrically driven trailer.

FIG. 1 shows one embodiment of the retarder brake system in accordance with the disclosure.

In the case under consideration, the retarder brake system 10 is a component of a vehicle combination 16 consisting of an agricultural tractor 12 and an electrically driven trailer 14. The vehicle combination 16 is merely schematically shown in FIG. 1, wherein the agricultural tractor 12 is connected with the trailer 14 via a trailer coupling (not shown). The trailer 14 is, for example, a transport trailer with a loadable tipping trough or a liquid tank.

The retarder brake system 10 includes a drive train 18 with a combustion engine 20 that is assigned to the agricultural tractor 12 and designed as a diesel motor. A vehicle transmission 22 downstream from the combustion engine 20, in the form of a so-called IVT (Infinitely Variable Transmission), has a first gear output 24 and a second gear output 26.

A mechanical drive axle 28, connected with the first gear output 24 in the shape of a drive rear axle, includes left and right rear wheels 30, 32, which can be acted on via an intermediate differential gear 34 by the combustion engine 20, with a drive torque that can be specified by a vehicle operator.

At the same time, several additional units 36 operated by means of the combustion engine 20 are provided. The additional units 36 are a hydraulic pump, air compressors, cooling fans, and the like.

Furthermore, there is a first electrical motor generator unit 38 connected with the second gear output 26 of the vehicle transmission 22. For example, with the second gear output 26, it is a PTO shaft connection provided on the front side of the agricultural tractor 12, which can be driven via a PTO shaft transmission 40 downstream from the vehicle transmission 22 and on which the first electrical motor generator unit 38 is placed in a detachable manner. The first electrical motor unit 38 is thereby a component of a PTO shaft generator 42. The PTO shaft generator 42 is a separate structural unit which consists of a carrying structure and has an intermediate gear 44 that can be connected with the PTO shaft connection of the agricultural tractor 12 and an electrical motor generator 46 downstream from the intermediate gear 44.

A second electrical motor generator unit 48 is used for the drive of an electrical drive axle 50, assigned to the trailer 14, which includes left and right drive wheels 52, 54. The drive wheels can be driven via a differential gear 56 by means of the second electrical generator unit 48. The control of the second electrical motor generator unit 48, including the specification of a corresponding drive torque for acting on the electrical drive axle 50, is hereby carried out by the agricultural tractor 12.

The two electrical motor generator units 38, 48 are driven by a rotary current and are electrically connected with one another via corresponding first and second two-way inverters 58, 60 and a direct current link 62. Depending on the mode of operation of the two-way inverters 58, 60 (they can be operated in a current production mode or a rectifier mode), each of the two electrical motor generator units 38, 48 can be operated either as a motor or as a generator.

The direct current link 62 is subdivided on the agricultural tractor 12 and the trailer 14, wherein the two parts are connected with one another by means of a power plug connector 64.

A control unit 66 is used for the coordination of the various components of the drive train 18, in particular the functions of the two two-way inverters 58, 60, the vehicle transmission 22 (including the switching between various speeds or the gear ratios), the injection of the combustion engine 20, the PTO shaft connection, and the additional units 36.

In normal operation, the PTO shaft generator 42 is used for providing the second electrical motor generator unit 48 with electrical energy. Proceeding from this normal operation, the vehicle operator can request a retarder operation via an operating unit 70 designed as a manual lever 68, in which the second electrical motor generator unit 48 is operated with a generator and the first electrical motor generator unit 38 is operated with a motor. To this end, the second two-way inverter 60 is in the current production mode and the first two-way inverter 58 in the rectifier mode.

By adjusting the manual lever 68, it is possible to specify the extent of the braking effect attained by means of the retarder brake system 10 by the vehicle operator. The control unit 66 converts the resulting operator command into a corresponding retarding requirement in the form of a gross retarder output requested on the electrical drive axle 50 of the trailer 14. This can be varied by a corresponding control of both two-way inverters 58, 60 on the basis of the execution of a complete or partial generator operation of the second electrical motor generator unit 48 within an output range defined by a nominal output, for which purpose both two-way inverters 58, 60 operate as shunt regulators.

Figure 2:
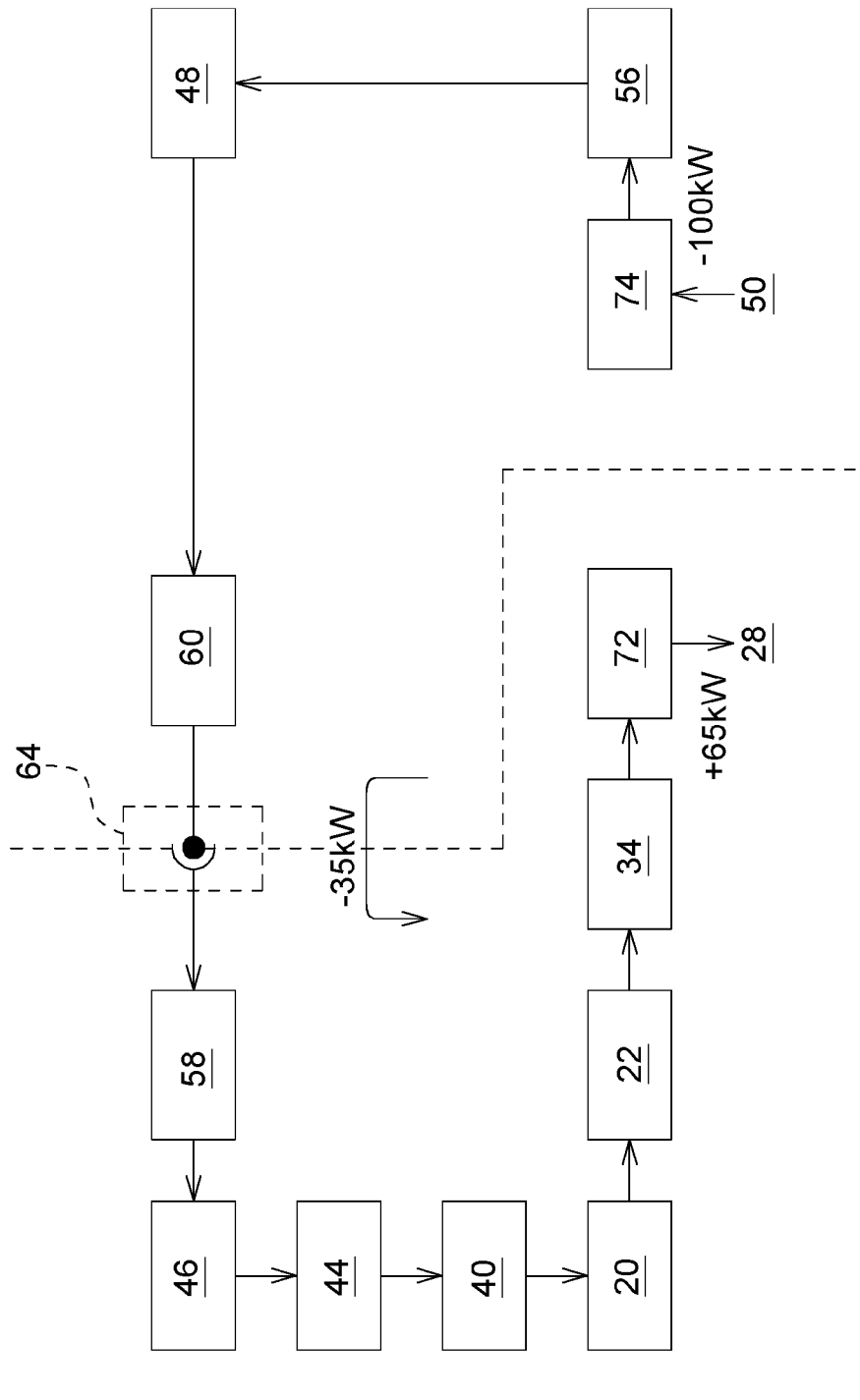
FIG. 2 is an energy flow diagram of a gross or net retarder output that can be attained by means of the retarder brake system of FIG. 1.

Each of the components of the drive train 18 is associated with a specific power loss, so that at least a part of the gross retarder output is dissipatively destroyed as a power loss within the drive train 18. This is illustrated in FIG. 2, in which an example of an energy flow diagram is shown. In addition to the combustion engine 20, vehicle transmission 22, differential gears 34, 56, two-way inverters 58, 60, PTO shaft gear 40, electrical motor generator units 38, 48, and intermediate gear 44, the components shown are additional mechanical drive components 72, 74 on the sides of the agricultural tractor 12 or trailer 14, such as wheel drives, axle bearings, and tractor or trailer tires.

Figure 3:
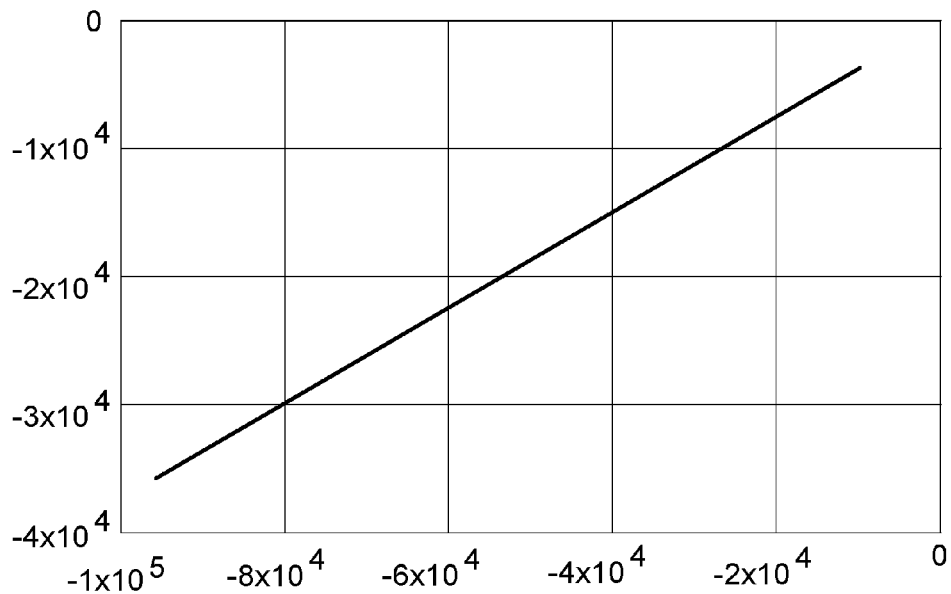
FIG. 3 is a diagram of the available net retarder output as a function of the gross retarder output.
Figure 4:
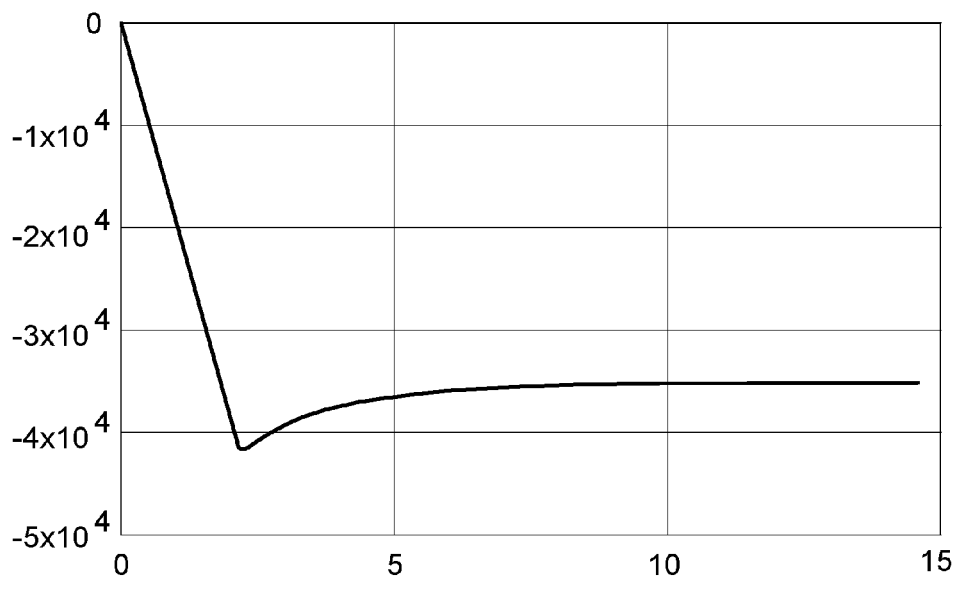
FIG. 4 is a diagram of the available net retarder output as a function of a travel speed of the vehicle combination.

Pursuant to the example, the gross retarder output requested on the electrical drive axle 50 as a result of the retarder request of the vehicle operator is −100 kW. The power loss of drive train 18 is, in this case, −35 kW, provided that the combustion engine 20 is drive-neutral and does not itself make any contribution to the power loss of the drive train 18 (motor brakes operation turned off). The power loss then forms the net retarder power of the drive train 18. In general, the net retarder output with the requested gross retarder output increases. This fact is shown in the diagram in accordance with FIG. 3 in which the available net retarder output (P_RET_NETTO) is illustrated as a function of the gross retarder output (P_RET_BRUTTO). The latter is also dependent on the vehicle speed ($v_f$) of the vehicle combination 16 and, in accordance with the above diagram shown in FIG. 4, has a traveling speed of approximately 5 m/s (corresponding to 18 km/h), an essentially constant course.

The excess, i.e., that is not dissipatedly destroyed, gross retarder output benefits the mechanical drive axle 28 of the agricultural tractor 12 and is available there as a corresponding propulsive power. In this example, the latter is +65 kW and takes care that the trailer 14 and the agricultural tractor 12 are always below a certain tension in the area of the trailer coupling. Consequently, an undesired giving way of the vehicle combination 16 is reliably avoided.

In summary, the braking effect of the retarder brake system 10 is thus based on a reversing of the energy flow in the drive train 18.

For the increase of the braking effect, the combustion engine 20 can also be operated in a motor brakes operation. For this purpose, the control unit 66 interrupts the fuel provision of the combustion engine 20 or at least extensively throttles it so that an increased motor drag torque or compression torque can be built up by the combustion engine 20.

The control unit 66 triggers the motor brake operation only if it detects that the power loss of the drive train 18 and thus the net retarder output have been exhausted during the retarder operation. Stated more precisely, the motor braking does not take place as long as the retarder requirement that is derived from the operator specification is held within the framework of the (possible) net retarder output. If it goes beyond this, the control unit 66 causes an increase of the braking effect by adding the motor brakes. Since the effect of the motor brakes increases with increasing rpm of the combustion engine 20, it is conceivable that at the same time the gear of the vehicle transmission 22 is downshifted in accordance with the requested gross retarder output. The latter can also take place with regard to the maintenance of a specific traveling speed of the vehicle combination 16.

In order to further increase the fraction of the dissipatively destroyed gross retarder output, the control unit 66 optionally adds the additional units 36 operated by means of the combustion engine 20.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A retarder brake system of a vehicle combination including an agricultural tractor and an electrically driven trailer, comprising:
    a drive train with a combustion engine;
    a vehicle transmission coupled to the engine;
    a mechanical drive axle of the agricultural tractor coupled to a first gear output of the transmission;
    a first electrical motor generator unit coupled to a second gear output; and
    an electrical drive axle of the trailer operably driven by a second electrical motor generator unit;
    wherein, the two electrical motor generator units are electrically coupled to one another via a direct current link;
    wherein, in a retarder operation, the second electrical motor generator unit is operated by a generator, and the first electrical motor generator unit is operated with a motor, where at least a portion of a gross retarder output requested on the electrical drive axle is dissipatively destroyed as a power loss within the drive train.

2. The retarder brake system of claim 1, wherein the combustion engine is operated in a motor brake operation.

3. The retarder brake system of claim 2, wherein the motor brake operation is triggered only if it is detected that the power loss of the drive train has been exhausted during execution of the retarder operation.

4. The retarder brake system of claim 1, wherein additional units operated by means of the combustion engine exhaust at least a part of the gross retarder output.

5. The retarder brake system of claim 1, wherein the second gear output is a front PTO shaft connection detachably coupled to the first electrical motor generator unit.

* * * * *